United States Patent [19]
Shalyt et al.

[11] 3,911,358
[45] Oct. 7, 1975

[54] METHOD OF AND DEVICE FOR DETERMINING THE DISTANCE TO A FAULT IN A WIRE OR CABLE LINE

[76] Inventors: German Mikhailovich Shalyt, ulitsa Udaltsova 55, kv. 55, Moscow; Boris Lvovich Kofman, Prospekt Lenina, 53, kv. 33, Bryansk; Valery Alexandrovich Polovnikov, Pereulak Fokina 8, kv. 60, Bryansk, all of U.S.S.R.

[22] Filed: Mar. 28, 1974

[21] Appl. No.: 455,957

Related U.S. Application Data

[63] Continuation of Ser. No. 368,066, June 8, 1973, abandoned, which is a continuation-in-part of Ser. Nos. 280,779, Aug. 15, 1972, abandoned, and Ser. No. 283,361, Aug. 24, 1972, abandoned, said Ser. No. 280,779, is a continuation of Ser. No. 74,072, Sept. 21, 1970, abandoned, said Ser. No. 283,361, is a continuation of Ser. No. 36,980, May 13, 1970, abandoned.

[30] Foreign Application Priority Data
May 21, 1969 U.S.S.R............................. 1332881

[52] U.S. Cl. .......................... 324/52; 179/175.3 F
[51] Int. Cl.² ................. G01R 31/08; G01R 31/11
[58] Field of Search ................ 324/52; 179/175.3 F

[56] References Cited
UNITED STATES PATENTS
2,800,627  7/1957  Oudin et al. ........................ 324/52
3,255,406  6/1966  Schluter ............................. 324/52

FOREIGN PATENTS OR APPLICATIONS
1,100,802  3/1961  Germany ............................ 324/52

*Primary Examiner*—Gerard R. Strecker
*Attorney, Agent, or Firm*—Holman & Stern

[57] ABSTRACT

A method and device for measuring the distance to a fault in a wire or cable line is disclosed, wherein sounding pulses are continuously sent at a preset repetition rate through the line being tested and wherein the line voltage is monitored throughout the measurement period, the monitoring commencing with a preset time delay with respect to sending each sounding pulse. Each first monitoring step coincides with a period of the presence of a sounding pulse, and the signals received from the line include both the reflected pulses and noise. Each second monitoring step conicides with a period of the absence of the sounding pulses, during which only noise is received from the line. Once the signals received during the two monitoring steps are amplified, they are separately integrated and the difference between the integrated values is determined. By varying the time delay, voltages across each portion of the line being tested are consequently measured, and the difference between the integrated voltage values, exceeding a certain level, is used to register the presence of a pulse reflected from the fault at a distance correlated to the time delay.

2 Claims, 4 Drawing Figures

METHOD OF AND DEVICE FOR DETERMINING THE DISTANCE TO A FAULT IN A WIRE OR CABLE LINE

CROSS REFERENCE TO RELATED APPLICATION

This is a continuation of application Ser. No. 368,066 filed June 8, 1973, now abandoned, which application, in turn, was a continuation-in-part application of U.S. application Ser. No. 280,779 filed on Aug. 15, 1972, and of U.S. application Ser. No. 283,371 filed on Aug. 24, 1972. U.S. application Ser. No. 280,779 is, in turn, a continuation application of application Ser. No. 74,072 filed on Sept. 21, 1970 and now abandoned, while U.S. application Ser. No. 283,361 is a continuation application of application Ser. No. 36,980 filed on May 13, 1970 and now abandoned. U.S. application Ser. Nos. 280,779 and 283,361 are now abandoned.

BACKGROUND OF THE INVENTION

The present invention generally relates to the art of electric measurements, and more particularly it relates to methods of measuring the distance to a fault in a wire or cable line, as well as to devices for effecting same.

Methods of determining the distance to a fault in a wire or cable line are known in the art which are based on measuring the time interval between the moment of sending a sounding electric pulse through the line and the moment of arrival of the pulse reflected from the fault (of. G.M. Shalyt "Detection of Faults in Power Lines by Pulse Methods", Moscow, "Energhia" Publishers, 1968 /in Russian/). The prior art methods consist in sending a train of pulses through a damaged line and receiving reflected pulses. Here and in what follows, a line is defined to be a wire or cable of various applications: an electric power transmission or telecommunication line cable, a control cable, etc.

The received pulses are amplified according to a law opposite to that of pulse attenuation in the line, then a cathode-ray tube is used to measure the time intervals between the moment of sending sounding pulses through the line and the moment of arrival of reflected pulses.

This method suffers from a number of disadvantages.

Firstly, the results of measurement are distorted due to the presence of noise in the signals arriving from the line; secondly, the measurement error is also aggravated by the temporary instability of the amplification and measurement channels; thirdly, the equipment effecting this method is costly because it includes a cathode-ray tube together with control devices.

There are also known devices for measuring the distance to a fault in a wire or cable line by using what is known as the pulse fault-detecting method (cf. Device P5-5, "Power Stations", No. 10, 1968, USSR /in Russian/). These devices also use cathode-ray tubes as indicating units.

The known devices comprise a timing pulse oscillator producing timing pulses to synchronize the operation of the whole device, which oscillator has two outputs, one output being connected to the input of a linearly-varying voltage generator and the other output being connected to the input of a sounding pulse generator sending sounding pulses through the line under test. This line is coupled, via an amplifier having its input connected to the output of the sounding pulse generator, to an indicating unit, a cathode-ray tube connected therewith the output of the linearly-varying voltage generator.

The disadvantages inherent in the above devices are:
the necessity to use cathode-ray tubes which substantially complicates the device and renders it expensive, as well as impairs its reliability;
low noise stability and measurement accuracy.

SUMMARY OF THE INVENTION

It is an object of the present invention, therefore, to provide a method of measuring the distance to a fault in a wire or a cable line which will exclude the effect of noise on the results of measurement, thus enhancing its accuracy.

Another object of the invention is to provide a device for measuring the distance to a fault in a wire or cable line, without a cathode-ray tube which will substantially cut down the size, weight and cost thereof and increase it reliability and noise stability.

These and other objects are attained in a method of measuring the distance to a fault in a wire or cable line wherein sounding pulses are continuously sent through the line at a preset repetition rate and, according to the invention, periodical monitoring is effected during measurement periods of the voltage across the line at a rate twice as high as that of repetition of the sounding pulses, the monitoring commencing with a time delay with respect to the moment of sending each sounding pulse, each first monitoring step coinciding. According to the invention, with a period of the presence of a sounding pulse, the signals arriving from the line thereat include both useful reflected pulses and noise, and each second monitoring step coinciding with a period of the absence of a sounding pulse, the signals arriving from the line thereat convey only noise, then the signals received during the monitoring steps are amplified, separately integrated and the difference between the integrated values is determined; by varying (adjusting) the time delay, voltages across each portion of the line being tested are consecutively measured, and the integrated voltage difference value, exceeding a certain level, is used to register the presence of a pulse reflected from the fault which is at a distance correlated to the preset time delay. A device for effecting the method comprises a clock pulse generator having two outputs, one output being connected to a control unit and the other output being connected to a linearly-varying voltage generator also having two outputs, one output thereof being coupled to a first input of a comparator and the other output thereof being coupled to a main input of a commutator which has another input connected to the output of the control unit, the output of the commutator being coupled to the input of a sounding pulse generator, the output thereof being coupled to the line being tested and to a first input of a pulse modulator a second input of the pulse modulator being connected to the output of a measuring pulse generator, the input thereof being connected to the output of the comparator, while the output of the pulse modulator is connected, via an amplifier, to a main input of a first switch having two outputs, each output thereof being coupled to a respective integrator, both integrators being coupled to an indicating unit and to two main inputs of a second switch the output of the second switch being connected to the second input of said pulse modulator, the first and second switches also having control inputs which are connected to the output of the control unit.

Such an arrangement makes it possible to increase the accuracy of measurement of the distance to a fault in a wire or cable line and render the device highly reliable and noiseproof

BRIEF DESCRIPTION OF THE DRAWINGS

A fuller understanding of the nature and objects of the invention will be had from the following detailed description, taken in conjunction with the accompanying drawings, wherein.

DETAILED DESCRIPTION OF THE PREFERRED EMBODIMENT

The method of measuring the distance to a fault in a wire or cable line consists in the following.

As is well known, short electric pulses sent through a damaged line are reflected from the fault and return in the form of reflected pulses to the initial point.

Figure 1:
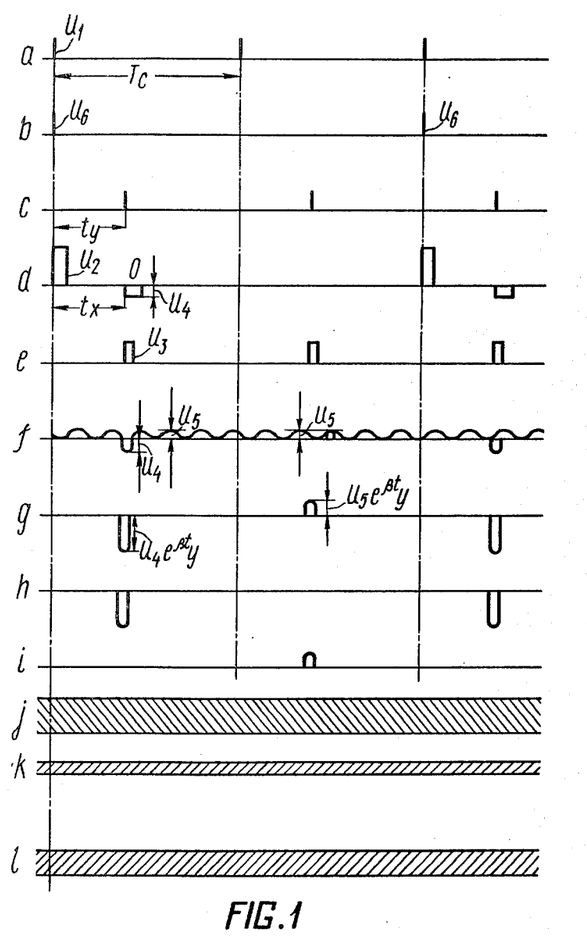
FIG. 1 shows graphically the waveforms of voltages corresponding to different steps of measurement, according to the invention.

According to the present invention, short clock pulses $U_1$ are generated following at preset time intervals Tc (FIG. 1a) and synchronizing all the other operations. Then, the repetition rate of the clock pulses is halved (FIG. 1b), and sounding pulses $U_2$ (FIG. 1d) are sent through the line being tested at this halved repetition rate.

After a preset time interval $t_y$ (FIG. 1c) elapsing from each clock pulse $U_1$, measuring pulses $U_3$ (FIG. 1e) are generated. The preset time interval $t_y$ corresponds to a particular length of the controlled portion of the line under test. The voltage across the line being tested is monitored during the measuring pulse $U_3$, the repetition rate of the measuring pulses $U_3$ being equal to that of the clock pulses. Each first monitoring step coincides with a period of the presence of a sounding pulse $u_2$, and if the portion of the line being checked (determined by the time delay $t_y$) is damaged, a pulse $U_4$ (FIG. 1d) is reflected from the fault. Each second monitoring step coincides with a period of the absence of a sounding pulse $U_2$ (as has been mentioned above the repetition rate of sounding pulses $U_2$ is twice as low as that of clock pulses $U_1$ and measuring pulses $U_3$). In this case, the reflected signals convey only the noise inherent in the line. Then, all the reflected signals are amplified, for example, in accordance with a law opposite to that of pulse attenuation in the line under test, i.e. an amplified pulse reflected from the fault will be equal to $U_4 e^{\beta t_y}$, where $U_4$ is said reflected pulse (FIG. 1d), $\beta$ is the attenuation factor, $t_y$ is the time delay of the measuring pulse $U_3$ (FIG. 1c).

Likewise, a noise signal will be equal to $U_5 e^{\beta t_y}$ (FIG. 1g) where $U_5$ is the noise signal.

Thereafter, the signals arriving from the line are separately integrated. Integration is done in two steps: first, reflected pulses coinciding with the periods of the presence of the sounding pulses $U_2$ are integrated, then those pulses are integrated which coincide with the periods of the absence of the sounding pulses $U_2$ (FIG. 1, j and k, respectively). Then, the difference between the integrated values is determined with a subtraction, i.e. compensation of all the noise and signal distortions in the amplification and measurement channels due to temporary instability and errors caused by supply voltage fluctuations, etc.

The resulting differential signal (FIG. 1) is only proportional to the values of reflected pulses received from the line during monitoring the voltage thereacross with the preset time delay $t_y$. The arrival of a reflected pulse $U_4$ is separated from the moment of sending a sounding pulse $U_2$ by a time interval $t_x$ (FIG. 1d). This time interval $t_x$ is in strict correlation to the time delay $t_y$ and is proportional to the distance to the fault. If the monitoring of the voltage across the line with the time delay $t_y$ fails to register the arrival of a reflected pulse $U_4$ (the difference between the integrated voltage values is near zero), the time delay is varied (adjusted), and the voltage across a next portion of the line is now monitored.

Figure 2:
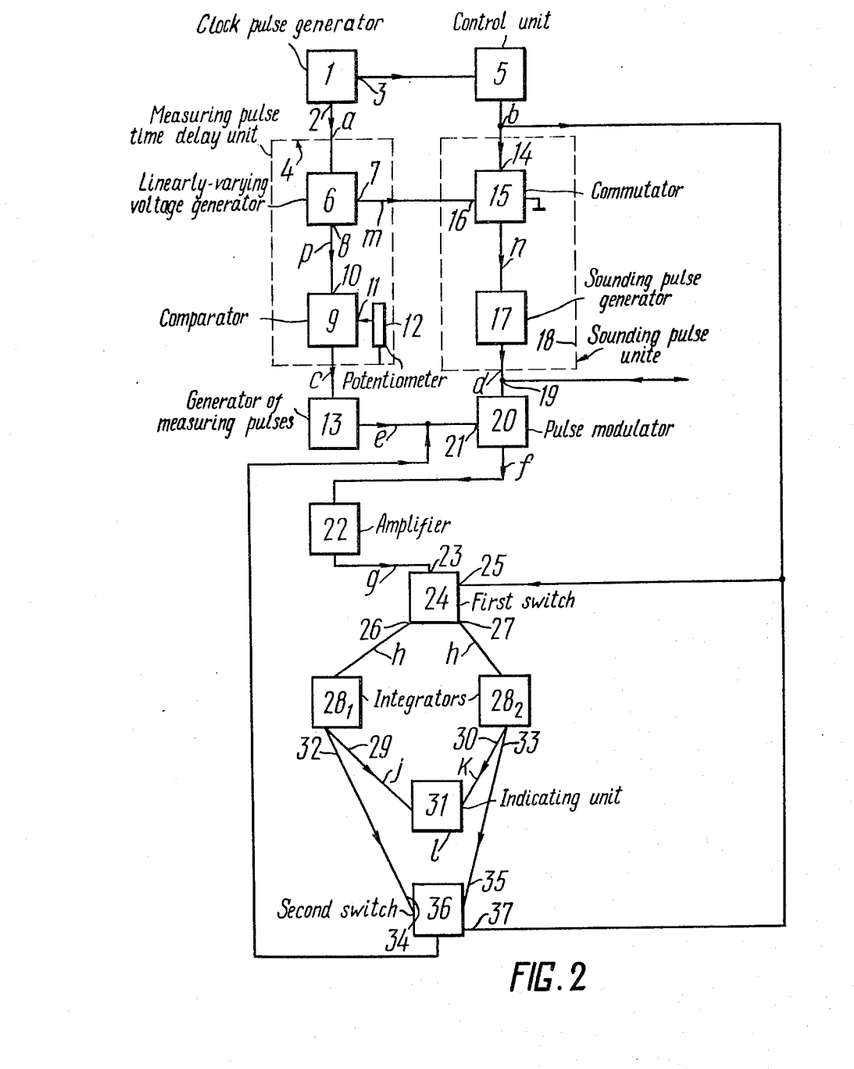
FIG. 2 is a block diagram of a device for measuring the distance to a fault in a wire or cable line, according to the invention.

Referring now to FIG. 2, the device for measuring the distance to a fault in a wire or cable line comprises a clock pulse generator 1 which has two outputs 2 and 3, the output 2 of the oscillator 1 being connected to the input of a measuring pulse time delay unit 4 and the output 3 being coupled to a control unit 5.

The clock pulse generator is intended to generate clock pulses $U_1$ following at certain repetition rate Tc (FIG. 1a) and to synchronize the operation of the whole device.

The control unit 5 is meant to produce short-duration control pulses $U_6$ (FIG. 1b), the repetition rate whereof is twice as low as that of the clock pulses $U_1$ produced by the generator 1.

The time delay unit 4 comprises a linearly-varying voltage generator 6 having two outputs 7 and 8 and a comparator 9 having two inputs 10 and 11. Connected to the input 10 of the comparator 9 is the output 8 of the generator 6, while connected to the input 11 of the comparator 9 is a potentiometer 12 designed to set predetermined voltage levels corresponding to the distance to the point being monitored of the line under test.

The linearly-varying voltage generator 6 produces pulses, which are sent from the output 7 in step with the timing pulses Tc, and a linearly-varying voltage which appears across the output 8.

The comparator 9 is intended to produce, across its output, voltage pulses spaced from the clock pulses $U_1$ by a time delay ty (FIG. 1c).

The output of the comparator 9 is coupled to the input of a generator 13 of measuring pulses (FIG. 1c).

The output of the control unit 5 is connected to a control input 14 of a commutator 15, a main output 16 thereof being coupled to the output 7 of the linearly-varying voltage generator 6. The output of the commutator 15 is connected to the input of a sounding pulse generator 17, both the commutator 15 and the generator 17 making up a sounding pulse unit 18. This unit 18 is intended to furnish sounding pulses $U_2$ sent through the line being tested at a repetition rate twice as low as Tc, i.e. the repetition rate of the clock pulses $U_1$ generated by the generator 1 (FIG. 1d).

The output of the generator 17 is coupled to the line being tested (following arrow "to the line" in FIG. 2) and to an input 19 of a pulse modulator 20, the second input 21 thereof being connected to the output of the measuring pulse generator 13. The input 19 of the pulse modulator 20 is also connected the line under test, while its output is coupled to an amplifier 22.

The pulse modulator 20 modulates measuring pulses $U_3$ by impressing thereon the voltage received by the modulator from the line being tested.

The output of the amplifier 22 is coupled to a main input 23 of a first switch 24, a control input 25 thereof being connected to the output of the control unit 5. An output 26 of the first switch 24 is connected to the input of an integrator $28_1$, while the other output 27 of the switch 24 is connected to the input of an integrator $28_2$. Each inegrator has two outputs. The first outputs 29 and 30 of both integrators are connected to an indicating unit 31, while the second outputs 32 and 33 of the integrators are connected to main inputs 34 and 35 of a second switch 36, a control input 37 thereof being coupled to the output of the control unit 5. The output of the second switch 36 is connected to the input 21 of the pulse modulator 20.

The indicating unit 31 serves to measure the difference between the voltages integrated in the integrators $28_1$ and $28_2$, which alternately receive signals from the amplifier 22 by means of the first switch 24. The second switch 36 ensures a feedback between the voltages across the integrators $28_1$ and $28_2$ and the line being tested.

The device of the present invention also comprises a power unit supplying voltages to each one of the above-mentioned units of the device, which power unit is made integral with said clock pulse generator 1.

A description of an embodiment of the circuitry of the proposed device is given hereinbelow, according to the invention.

The clock pulse generator (FIG. 3) and the power unit comprise a voltage changer and rectifiers with filters. The voltage changer serving as a square clock pulse generator is built around transistors 38 and 39 in a multivibrator circuit with a magnetic positive feedback. Power is supplied to the entire device from secondaries 44 and 45 of a transformer 40 of the voltage changer via rectifiers using diodes 44 through 57 and filters 58 through 62.

Figure 3:
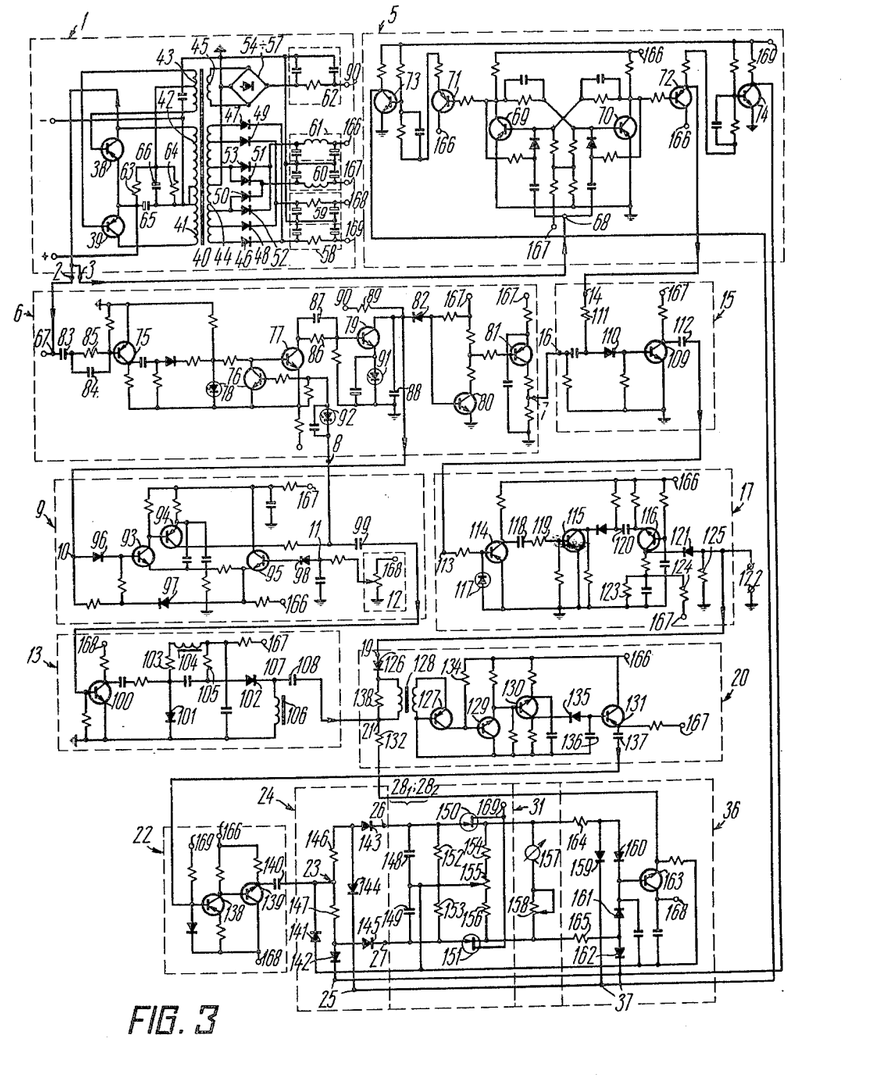
FIG. 3 is a circuit diagram of an embodiment of the device for measuring the distance to a fault in a wire or cable line, according to the invention.

A voltage divider employing resistors 63 and 64 and capacitors 65 and 66 is connected between the positive terminal of a storage battery (not shown) and the negative terminal of the battery which is connected to the coupled emitters of the transistors 38 and 39, the negative terminal being further connected to the common point of halves 41 and 42 of a primary of the transformer 40 and the center tap of another primary 43 of the transformer 40 being connected to the common point of the resistors 63 and 64.

This voltage divider serves to start the voltage changer as the circuit of the power supply from a storage battery is closed.

The collector of the transistor 38 of the generator 1 is connected to the input of the linearly varying voltage generator 6 (point 67) and to the input of the control unit 5 (point 68).

The control unit 5 comprises a flip-flop built around transistors 69 and 70 in a balanced circuit, power amplifiers using transistors 71 and 72 in an emitter-follower circuit, and control switches using transistors 73 and 74.

The collectors of the transistors 69 and 70 are connected to the bases of the transistors 71 and 72, respectively, of the power amplifiers. The collector of the transistor 72 is coupled to the input 14 of the commutator 15 and also to the input of the switch built around the transistor 73. The collectors of the transistors 73 and 74 of the control switches are connected to the control inputs 25 and 27 of the switches 24 and 36, respectively.

The linearly-varying voltage generator 6 comprises a trigger circuit employing transistors 75, 76 and 77 and a tunnel diode 78, a generator built around a transistor 79 and a zero-clamping circuit using transistors 80, 81 and a diode 82.

The trigger circuit is intended to obtain a negative trigger pulse. The base of the input transistor 75 of this circuit is connected to the output 2 of the generator 1 via a capacitor 83 and parallel-connected capacitor 84 and resistor 85. The collector of the output transistor 77 of this circuit is coupled, via parallel connected resistor 86 and capacitor 87, to the base of the transistor 79 of the linearly-varying voltage generator proper, the operating principle of the generator being based on the discharge of a timing capacitor 88 through a current-limiting resistor 89 from a high-potential source 90. The initial potential across the capacitor 88 is determined by a Zener diode 91 inserted between the emitter of the transistor 79 and the grounded terminal of the capacitor 88. The base of the transistor 76 of the trigger circuit is coupled to the comparator 9 via a diode 92.

The collector of the transistor 79, the capacitor 88 being coupled thereto, is connected to the cathode of the diode 82 of the zero-clamping circuit intended to produce a pulse at the instant when the linearly-varying voltage from the generator 6 passes through zero. The collector of the transistor 80 of this circuit is coupled to the input 16 of the commutator 15 via an amplifying stage using the transistor 81.

The comparator 9 employed to compare the value of the linearly-varying voltage with that of the reference voltage is made as a comparison circuit built around transistors 93, 94, 95 and diodes 96, 97, 98, the diode 98 being placed in series with the base-emitter junction of the transistor 94. The reference voltage is set by means of the wiper-arm of the potentiometer 12, each position of the wiper-arm corresponding to the distance to a point being monitored in the line under test.

The collector of the transistor 94 is coupled via a capacitor 99 to the input of the measuring pulse generator 13, i.e. to the base of a transistor 100.

The linearly-varying voltage generator 6 and the comparator 9 make up the unit 4 of delaying a measuring pulse $U_3$ relative to a sounding pulse $U_2$.

The measuring pulse generator 13 is built around the transistor 100 and charge storage diodes 101 and 102. Connected between the anodes of the diodes 101 and 102 is a circuit including series-connected resistor 103, first choke 104 and resistor 105, as well as a second choke 106 inserted between the cathode of the diode 102 and a grounded lead having the cathode of the diode 101. The diode 101 coupled thereto together with the chokes 104 and 106 shape the leading edge of a measuring pulse, while the diode 102 together with the same chokes 104 and 106 shape its trailing edge. The duration of a measuring pulse $U_3$ is determined by the current through the diode 102 in the initial state. The output of the generator 13 (point 107) is connected via a capacitor 108 to the input 21 of the pulse modulator 20.

The commutator 15 employs a transistor 109 and a diode 110 and is intended to separate every second pulse from a train of pulses applied to its main input 16 to trigger the sounding pulse generator 17. The main input 16 of the commutator 15 is coupled to the output 7 of the generator 6 with the collector of the transistor 81), while the control input 14 is coupled via a resistor 111 to the collector of the transistor 72 of the power amplifier of the control unit 5. The output of the commutator 15, the collector of the transistor 109, is connected via a capacitor 112 to the input (point 113) of the sounding pulse generator 17.

The sounding pulse generator 17 is built around transistors 114, 115 and 116. The first amplifying stage of the generator 17 employs the transistor 114. A tunnel diode 117 connected to the base of this transistor is used to shape the leading edge of trigger pulses. The collector of the transistor 114 is coupled via a capacitor 118 and a resistor 119 to the base of the transistor 115. The duration of a sounding pulse $U_2$ is determined by the capacitance of the capacitor 120 and the input resistance of the transistor 116 connected to the output stage of the generator 17.

The collector of the transistor 116 is coupled via a decoupling diode 121 to a terminal 122 of the device. The the line being tested is connected through a cable (not shown) to the terminal 122. A divider using resistors 123 and 124 is provided to apply the initial non-conducting voltage to the diode 121. A load resistor 125 matches the output of the generator 17 with the connecting cable. The output of the generator 17, namely the anode of the diode 121 is also connected to the input 19 of pulse modulator 20.

The pulse modulator comprises a converter built around a diode 126, a transistor 127, a transformer 128, as well as a preamplifier using transistors 129, 130 and 131.

The anode of the diode 126, i.e. the input 19 of the pulse modulator 20, is connected to the terminal 122 of the device, the line being tested being coupled thereto, while the cathode of the diode 126 is connected to one of the ends of the primary of the transformer 128.

Connected to the other end of the primary of the transformer 128, i.e. to the input 21 of the modulator 20, are the output of the generator 13 and a resistor 132, the latter being also connected to the switch 36. Placed in parallel with the primary of the transformer 128 is a resistor 133. The secondary of the transformer 128 is connected to the emitter and the base of the transistor 129 which is the first stage of the preamplifier, and to a resistor 134. The second stage of the preamplifier is a detector built around the transistor 130, a diode 135 and a capacitor 136. The output stage of the preamplifier is an emitter follower using the transistor 131. The emitter of the transistor 131 is connected via a capacitor 137 to the input of the amplifier 22.

The amplifier 22 is built around transistors 138 and 139. The stage of this amplifier using the transistor 139 is a power amplifier. The emitter of the transistor 139 is connected via a capacitor 140 to the input 23 of the first switch 24.

The first switch 24 is built around diodes 141 through 145, the cathode of the diode 142 being connected to the collector of the transistor 74 of one control switch of the control unit 5, and the cathode of the diode 144 being connected to the collector of the transistor 73 of the other control switch of the unit 5. The coupled anodes of the diodes 143 and 144 are connected via a resistor 146 to the point 23, the coupled anodes of the diodes 142 and 145 being also connected via a resistor 147 to the point 23. The cathodes of the diodes 143 and 145 of this switch (outputs 26 and 27) are connected, respectively, to capacitors 148 and 149 of the integrators $28_1$ and $28_2$, while the anode of the diode 141 is connected to the common point of the two capacitors 148 and 149. These capacitors are connected, respectively, to the inputs of source followers 150 and 151 having a high input resistance and serving for match with the indicating unit 31. Series-connected resistors 152 and 153 placed in parallel with the inputs of the source followers 150 and 151 ensure the stability of their input resistance. Series-connected resistors 154, 155 and 156 are connected between the outputs of the source followers so that the wiper-arm of the adjustable resistor 155 is coupled to the common point of the resistors 152 and 153, and serve to preset the modes of the transistors 150 and 151 (to ensure zero setting of the indicating unit 31 in the absence of pulses reflected from the line being tested).

Used as the indicating unit 31 in the device is, according to the invention, a magneto-electric microammeter 157 placed in series with an adjustable resistor 158 designed to set the required sensitivity of the indicating unit 31.

The micro-ammeter 157 and the resistor 158 are connected to the outputs of the source followers 150 and 151.

The second switch 36 is built around diodes 159 through 162 and a transistor 163. The cathodes of the diodes 159 and 162 are connected, respectively, to the collectors of the transistors 73 and 74 of the control switches of the control unit 5 (in a manner similar to that of the connections in switch 24).

The coupled anodes of the diodes 159 and 160 are connected via a resistor 164 to the output of the source follower 150, while the coupled anodes of the diodes 161 and 162 are connected via a resistor 165 to the output of the source follower 151. The coupled cathodes of the diodes 160 and 161 are connected to the base of the transistor 163 which is a power amplifier arranged on the lines of an emitter follower. The emitter of the transistor 163 is connected via the resistor 132 to the input 21 of the pulse modulator 20. This feedback ensures stable and accurate operation of the device in a wide dynamic range.

Power is supplied to various units of the device from terminals 90, 166, 167, 168 and 169 in the generator 1 (FIG. 3).

The operation of the device for effecting the method of the present invention will now be considered.

Figure 4:
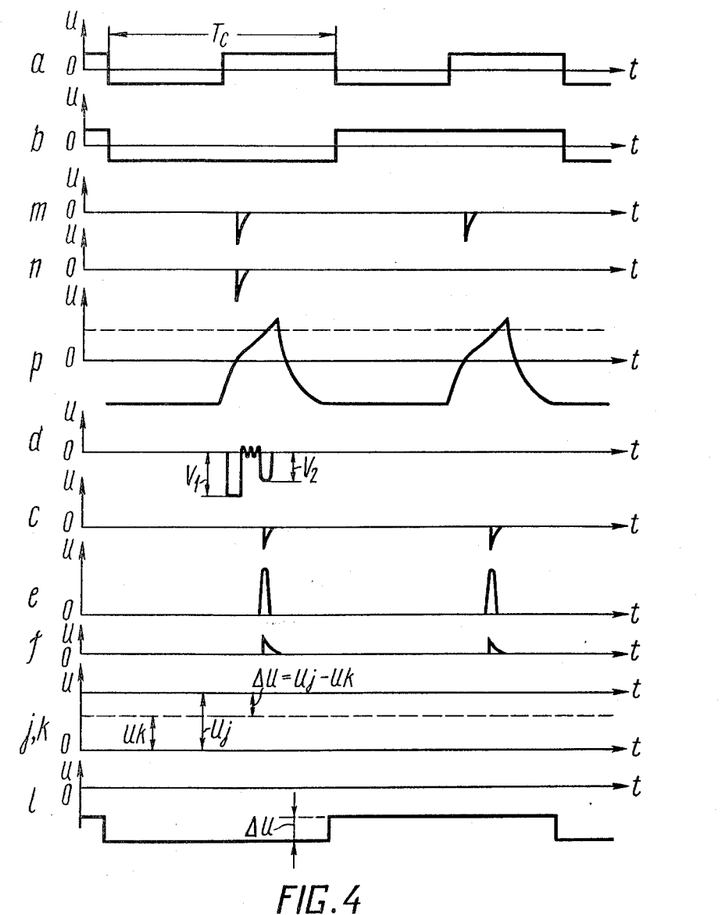
FIG. 4 shows graphically the waveforms of voltages across different points of the circuit of FIG. 2, according to the invention.

The clock pulse generator 1 (FIG. 2) produces square pulses, "meanders" (FIG. 4a), following at a repetition rate Tc (FIG. 1a) to the input of the control unit 5 and the time delay unit 4. The pulses applied to the time delay unit 4 trigger the linearly-varying voltage generator 6.

The latter produces sharp pulses (FIG. 4m) across its output 7, following in step with the pulses at its input, which, via the commutator 15, trigger the sounding pulse (FIG. 4n) generator 17. Applied to the control input 14 of the commutator 15 are pulses, "meanders", from the output of the control unit 5 at a repetition rate twice as low as that of the pulses produced by the generator 1 (FIG. 4b). Therewith, the commutator 15 produces pulses across its output in step with the arrival of each second pulse to its main input 16. The generator 17 sends sounding pulses $U_2$ through the line under test in step with the arrival to its input of pulses from the output of the commutator 15 (FIGS. 1 d and 4d), from which it can be inferred that the repetition rate of the sounding pulses $U_2$ is twice as low as that of the clock pulses $U_1$ from the generator 1.

The linearly-varying voltage (FIG. 4p) appearing across the output 8 is applied to the input 10 of the comparator 9. The zero level of the linearly-varying voltage (its initial point) fully coincides with the leading edge of the pulses from the output 7 of the generator 6, which ensures high measurement accuracy. By means of the potentiometer 12 coupled to the input 11 of the comparator 9, the operator measuring the distance to a fault in a wire or cable line sets, across the input 11 of the comparator 9, the voltage level corresponding to the distance to a point being monitored in the line under test. A pulse appears across the output of the comparator 9 at the moment when the linearly-varying voltage reaches the level set by means of the potentiometer 12 (FIG. 4p,c). In this case, the time interval between sending a sounding pulse from the generator 17 and a pulse from the output of the comparator 9 is proportional to the voltage level across the input 11 of the comparator 9 (FIGS. 1 and 4, d and c). This time interval is directly proportional to the distance to the point being monitored by the operator.

The pulses from the output of the comparator 9 synchronously trigger the measuring pulse generator 13 and the latter produces pulses $U_3$ applied from its output to the input 21 of the pulse modulator 2C (FIGS. 1 e and 4e).

Applied to the input 19 of the modulator 20 is the voltage from the line being tested. During one time period (each odd period), this voltage has the form of a signal including both reflected pulses (if there is a fault in the line portion being checked) and noise, while during another time period (each even period), the signal consists of noise only.

The pulse modulator 20 modulates the amplitude of the measuring pulses $U_3$ applied to its input 21, proportionally with the voltage arriving from the line being tested. From the output of the modulator 20, the pulses (FIGS. 1 f and 4f) are applied to the amplifier 22, and from its output the amplified pulses are sent to the main input 23 of the first switch 24. In accordance with the control pulses $U_6$ arriving from the unit 5 to the control input 25 of the switch 24, the latter alternately sends to its outputs 26 and 27 pulses applied to its main input 23. During the time periods when sounding pulses $U_2$ arrive (each odd period), pulses from the output 26 are applied to the integrator $28_1$ (FIG. 1h), and in the absence of sounding pulses, pulses from the output 27 are sent to the integrator $28_2$ (FIG. 1i). Consequently, the integrator $28_1$ integrates the pulses reflected from the line under test together with the noise (FIGS. 1j and 4j), while the integrator $28_2$ only integrates the noise (FIGS. 1k and 4k). The difference between the values integrated by both integrators is measured by the indicating unit 31, the signal across its output unambiguously representing the noise-free voltage signals from the line which are subtracted (compensated) (FIGS. 1l and 4l).

In order to ensure stable operation and high accuracy of the device in a wide range, provision has been made for a feedback between the integrators $28_1$ and $28_2$ and the pulse modulator 20 which receives the voltage from the line being tested. The signals from the outputs of the integrators $28_1$ and $28_2$ are applied to the second switch 36, the control voltage from the output of said control unit 5 at a repetition rate twice as low as that of the clock pulses from the generator 1. An output pulse from the switch 36 is applied to the input 21 of the pulse modulator 20 thus forming the feedback.

The device for measuring the distance to a fault in a wire or cable line built around the circuitry disclosed herein above (FIG. 3) 3) operates as follows.

When the device is energized from a storage battery (not shown) through the voltage divider using the resistors 63, 64 and capacitors 65, 66, the voltage changer in the unit incorporating both the clock pulse generator 1 and the power unit is started. The transistors 38 and 39 operate, as this take place, as a multivibrator in a push-pull circuit with current commutation in the primary 41–42 of the transformer 40 (FIG. 3), and the voltage across each half 41 and 42 of the primary of said transformer 40 has a rectangular shape. Square pulses, "meanders" (FIG. 4a), produced by the generator 1 trigger the control unit 5 and the linearly-varying voltage generator 6. The flip-flop using the transistors 69 and 70 of the unit 5 is controlled directly from the collector of the transistor 38 of the generator 1. The flip-flop operates in counting mode and halves the repetition rate of the clock pulses from the generator 1. Square pulses, "meanders", are applied, at a repetition rate (FIG. 4b) twice as low as that of the pulses applied to the input (point 68) of the unit 5 (FIG. 3), to the input 14 of the commutator 15 via the power amplifier employing the transistor 72. The signals from the collectors of the transistors 69 and 70 of the flip-flop are applied via the power amplifiers employing the transistors 71 and 72 to the bases of the transistors 73 and 74 of the control switches. At the arrival of the signals, the switches operate and the signals from the collectors of the transistors 73 and 74 are fed, respectively, to the control inputs 25 and 37 of the switches 24 and 36.

As has been mentioned above, the signal from the collector of the transistor 38 of the generator 1 is also applied to the input (point 67) of the unit 4 (FIG. 2) delaying a measuring pulse $U_3$ relative to a sounding pulse $U_2$.

In the initial state (prior to the arrival of a signal to the input of the generator 6), the quiescent point of the tunnel diode 78 (FIG. 3) lies on the first upward portion of its characteristic curve (not shown), the transistors 75 and 77 are non-conducting, the transistor 79 is saturated, and the timing capacitor 88 is charged through the transistor 79 to a negative potential determined by the Zener diode 91.

As the negative voltage drop from the transistor 38 is applied via the capacitors 83, 84 and the resistor 85 to the base of the transistor 75, formed across the collector thereof is a positive voltage drop which throws the quiescent point of the diode 78 over to the second upward portion of the characteristic curve. The transistor 77 is rendered conducting, the negative voltage from its collector is applied via the parallel-connected resistor 86 and capacitor 87 to the base of the transistor 79 cutting it off. The timing capacitor 88 starts to be charged through the current-limiting resistor 89 from the high-potential source 90. In order to ensure high linearity of the voltage produced by the generator 6, use is made of the increase of the voltage across the capacitor in the order of 5% with respect to the voltage from the source.

The voltage across the capacitor 88 ceases to increase at the instant when the linearly-varying voltage becomes equal to the reference voltage from the wiper-arm of the potentiometer 12. These voltages are compared by the comparator 9 as follows. The positive reference voltage from the wiper-arm of the potentiometer 12 is fed via the diode 98 to the base of the transistor 95. Since in the initial state the voltage across the capacitor 88 is lower than the potential across the base of the transistor 95, the transistor 93 remains non-conducting until the linearly-varying voltage becomes equal to the reference voltage. As this takes place, the transistor 93 is triggered to conduction, and the pulse from its collector is applied to the amplifying stage employing the transistor 94. The positive feedback from the emitter of the transistor 94 to that of the transistor 93 brings about an abrupt triggering of the transistor 93 to conduction and a positive pulse (FIG. 4c) is formed across the output of the comparator 9 (across the collector of the transistor 94). This positive signal renders, through the diode 92, the transistor 76 of the generator 6 conducting. The conducting transistor 76 shunts the tunnel diode 78, thus bringing it to the initial state with its quiescent point lying on the first ascending portion of its characteristic curve. The transistor 77 becomes non-conducting therewith, and the circuit through which the negative potential is applied to the base of the transistor 79 is broken. The transistor 79 becomes conducting, and the timing capacitor 88 is discharged (FIG. 4p). The amplitude of the linearly-varying voltage is determined by the reference voltage, while its characteristic curve slope and, consequently, the controlled limits of the delay of a measuring pulse $U_3$ are determined by the selected capacitance value of the capacitor 88.

To register the moment when the linearly-varying voltage passes through zero and to apply, at this moment, a pulse to the input 16 of the commutator 15, provision has been made for the zero-clamping circuit employing the transistors 80 and 81. This circuit operates as follows. In the initial state, the transistor 80 it cut off, while the transistor 79 is, as has been mentioned above, conducting. As the same time, the capacitor 88 is charged to a negative potential determined by the Zener diode 91. From the capacitor 88, the negative potential is delivered via the diode 82 to the base of the transistor 80, thereby bringing the zero-clamping circuit to the initial state. As the trigger pulse arrives to the base of the transistor 79, the transistor is rendered non-conducting, the voltage across the capacitor 88 starts to increase and, as it reaches the zero level, the transistor 80 becomes conducting. Therewith, the signal from its collector is applied to the amplifying stage using the transistor 81, the signal from the collector thereof (FIG. 4m) being transmitted to the input 16 of the commutator 15.

These signals are applied, having the same repetition rate as the pulses from the clock pulse generator 1, to the anode of the diode 110 of the commutator 15. Also applied thereto via the resistor 111 are the signals from the collector of the transistor 72 of the control unit 5, which signals control the diode 110. The repetition rate of these signals is twice as low as that of the clock pulses $U_1$ (Tc). Consequently, the possibility of a pulse from the generator 6 passing through the commutator 15 is determined by the state of the diode 110: under a positive voltage, the diode is conducting and the signal (FIG. 4n) is applied via the amplifying stage employing the transistor 109 and via the capacitor 112 to the sounding pulse generator 17 to trigger it; under a negative voltage the diode 110 is non-conducting and no signal can pass therethrough.

At the same time, the moment at which the sounding pulse generator 17 is triggered coincides with that at which the linearly-varying voltage passes through zero (as has been mentioned above, pulses from the generator 6 are applied to the input of the commutator 15 precisely at this moment), which ensures a substantially high measurement accuracy.

The trigger pulse from the ouput of the commutator 15 is applied to the input of the amplifier built around the transistor 114 operating in switching mode. The signal from the collector of the transistor 114 is applied via the capacitor 118 and the resistor 119 to the base of the transistor 115 also operating in switching mode. The output parameters of this transistor determine the leading edge of a sounding pulse and its amplitude. The capacitance of the capacitor 120 and the input resistance of the transistor 116 of the output stage determine the duration of the sounding pulse $U_2$ being shaped. The sounding pulses $U_2$ (FIG. 4d) from the collector of the transistor 116 are fed through the decoupling diode 121 to the line under test coupled to the terminal 122. While passing through the line being tested, the sounding pulses $U_2$ are reflected from a fault in that line and return as reflected pulses $U_4$ to the point from which they were sent, i.e. to the terminal 122 of the device.

The voltage across the line being tested is monitored during a time period equal to the duration of measuring pulses $U_3$ produced by the measuring pulse generator 13. The generator 13 operates in the following manner.

In the initial state, the transistor 100 is cut off. As the comparator 9 operates, a positive signal from the collector of the transistor 94 is fed via the capacitor 99 to the base of the transistor 100 of the generator 13. The transistor 100 is rendered conducting and a negative voltage drop is formed across its collector, which voltage drop is applied to the pulse shaping circuit employing the storage diodes 101 and 102 and chokes 104 and 106. In the initial state, the diodes 101 and 102 are connected via the resistors 103 and 105 to the supply terminal 167 and are conducting. The current of the diode 101 in the initial state determines the leading edge of a measuring pulse $U_3$, and the diode 101 shunts the input of the transistor 100 during this time period. On the arrival of the cut-off voltage from the collector of the transistor 100, the charge stored by the diode 102 is dissipated and the diode is conducting, then, as the charge dissipation is over, the reverse resistance of the diode is restored at once and the diode becomes non-conducting. Thus, the shaping of the trailing edge of a measuring pulse $U_3$ takes place. The duration of the latter is determined by the current of the diode 102 in the initial state. From the output of the generator 13, the measuring pulse (FIG. 4e) is applied via the capacitor 108 to the input 21 of the pulse modulator 20, while the input 19 of the latter (anode of the diode 126) receives a signal from the line under test.

In the initial state, the converter diode 126 is cut off by the positive bias voltage $E_6$, coming from the emitter of the transistor 163 of the second switch 36.

As a measuring pulse $U_3$ from the generator 13 arrives, the current through the circuit of the diode 126 is determined by the following potentials applied to the diode: the bias voltage $E_6$, the amplitude of the measuring pulse $U_3$ and the signal from the line being tested.

During the period when a sounding pulse $U_2$ being sent from the generator 17 to the line under test (each odd period), the signal coming from the line includes pulses reflected from the fault (if there is one on the line portion being monitored and determined by the position of the wiper-arm of the potentiometer 12) and noise, while in the period of the absence of a sounding pulse (each even period), the signal conveys only noise.

Acted upon by the coming signals (a measuring pulse $U_3$ and the voltage from the line), the diode 126 is triggered to conductance, and a voltage appears across the resistor 133, which is applied via the transformer 128 to the emitter circuit of the transistor 127. The output capacitor of the stage employing the transistor 127 is charged with the current of this transistor to a level proportional to the current through the converter diode 126.

On completion of the measuring pulse $U_3$, the diode 126 and the transistor 127 are cut off, and the output capacitor of the stage employing the transistor 127 starts to slowly discharge through the resistor 134 and the input resistance of the emitter follower employing the transistor 129. The signal from the output of this emitter follower is fed to the amplifying stage using the transistor 130, the diode 135 and the capacitor 136. The latter is charged through the diode 135 with the voltage from the collector of the transistor 130 and discharged through the input resistance of the emitter follower using the transistor 131. The output signal (FIG. 4f) from the emitter of the transistor 131 is fed via the capacitor 137 to the input of the amplifier 22. Amplified in the latter, the positive pulse from the emitter of the transistor 139 of the output stage of the amplifier 22 is fed via the capacitor 140 to the input 23 of the first switch 24. The positive pulse is applied via the resistor 146 to the anodes of the diodes 143 and 144 and via the resistor 147 to the anodes of the diodes 142 and 145. Applied to the cathodes of the diodes 144 and 142 are control pulses from the control unit 5, from the collectors of the transistors 73 and 74 of the control switches. In the period of the presence of a sounding pulse $U_2$, the diode 144 is cut off by a control pulse arriving thereto, while the diode 142 is rendered conducting and shunts the input 27 of the integrator $28_2$ via the transistor 74. The capacitor 148 of the integrator $28_1$ is charged via the diode 143 with the pulses whose amplitude is proportional to the summarized voltage of the measuring pulse $U_3$ and the reflected pulse $U_4$ coming from the line together with noise $U_5$ (FIG. 4j).

In the period of the absence of a sounding pulse $U_2$, the diode 142 is cut off by the control pulses from the unit 5 passing, via the diode 145 to the input 27 of the integrator $28_2$, pulses whose amplitude is proportional to the total voltage of the measuring pulse $U_3$ and noise $U_5$. In so doing, the capacitor 149 of the integrator $28_2$ is charged (FIG. 4k). The voltages integrated in the integrators $28_1$ and $28_2$ are applied via the source followers 150 and 151 to the indicating unit 31, the magneto-electric micro-ammeter 157 thereof determines the difference between the two integrated voltage values (FIG. 4l).

Additionally, the voltage from the source followers 150 and 151 is applied via the resistors 164 and 165 to the second switch 36. Applied to the control input 37 of this switch cathodes of the diodes 159 and 162 are control pulses from the control switches of the control unit 5. The second switch 36 operates in a manner like the first switch 24. Acted upon by control pulses from the unit 5, the diodes 159 and 162 alternately connect the amplifying stage using the transistor 163 to the integrator $28_1$ or $28_2$. The signal from the output of the transistor 163 is fed via the resistor 132 to the input 21 of the pulse modulator 20, thus providing for a feedback between the voltage across the integrators $28_1$ and $28_2$ and the signal coming from the line being tested to the input 19 of the pulse modulator 20.

The amplifier of the modulator 20 and the amplifier 22 together with the feedback allow the automatic control system tending to equalize the voltage across an integrator 28 with the voltage coming from the line being tested at the arrival of a measuring pulse.

The reading of the micro-ammeter 157 is proportional to the pulse voltage across the line under test for a particular delay of a measuring pulse $U_3$ relative to a sounding pulse $U_2$, i.e. for a particular distance to the portion being monitored of the line under test.

As the operator moves the wiper-arm of the potentiometer 12, the level at which the comparator 9 operates changes and the moment at which the linearly-varying voltage of the generator 6 crosses the reference voltage set by the comparator 9 is shifted in time, i.e. a change takes place in the time delay of a measuring pulse $U_3$ relative to a sounding pulse $U_2$, each position of the wiper-arm of the potentiometer 12 corresponding to a stabilized reading of the micro-ammeter 157 because during the fraction of a second which it takes for the wiper-arm of the potentiometer 12 to move from one position to another, sounding pulses are sent scores of times and invariable voltages appear across the capacitors 148 and 149 (the voltage across the former capacitor being the average level of the noise and measuring pulses $U_3$ together with the signals arriving from the line under test in the periods when the sounding pulses $U_2$ being sent to the line, and the voltage across the latter capacitor being the average level of the noise $U_5$ and measuring pulses $U_3$).

While moving the wiper-arm of the potentiometer 12, the operator also watches the movement of the pointer of the micro-ammeter 157. The position of the wiper-arm of the potentiometer 12 at which the pointer of the micro-ammeter 157 sharply deflects corresponds to the place of a fault in the line being tested. Since the scale of the potentiometer 12 is graduated in meters, the operator can directly determine the distance to the fault.

Thus, the proposed method of measuring the distance to a fault in a wire or cable line permits pinpointing of the fault, even with high-intensity noise, with a far greater accuracy than any other known method can offer.

The device dislosed herein is characterized by high accuracy and resolving power, as well as a substantial noise stability. The absence of a cathode-ray tube renders the device cheaper, more robust, simpler and more reliable in operation than any other prior art device of similar application.

The proposed device can be employed to measure the distance to faults in wire and cable lines of any length (from 0.5 m to 500 km) and application: power and control cables, coaxial and balanced cables, aerial power and communication lines, interior wiring in various buildings, structures, machines and mechanisms, wires and cables in vehicles, and many others.

Apart from accurately measuring the distance to a fault in a wire or cable line, the proposed device can also be used to accurately measure the reflection factor, thus making it possible to determine the degree of non-uniformity of cables and signal transmission channels. In most cases, the device can easily be attended by an unskilled operator. The device is also characterized in that it takes very little time to prepare it for measurements after switching it on.

What is claimed is:

1. A method of measuring the distance to a fault in a wire or cable line comprising the steps of:

continuously sending sounding voltage pulses through the line at a preset repetition rate throughout a measuring period; periodically monitoring the voltage in the line at a rate twice as high as the repetition rate of said sounding pulses, the monitoring commencing after the sending of said sounding pulses with a time delay whose value corresponds to the distance of a portion of the line being monitored each first monitoring of the voltage of the line coinciding with the period of the presence of a sounding pulse, the signals coming from said line comprising pulses reflected from the fault when the portion of the line being monitored is faulty and noise, and each second monitoring coinciding with the period of the absence of a sounding pulse, the signals coming from said line including only noise; amplifying the signals received from said line during both said monitorings; separately integrating said signals and determining the difference between the integrated values; successively monitoring the voltages across each portion of said line by measuring the value of said time delay in order to obtain said difference between the integrated values of the signals coming from the line, the value of said difference of the integrated values exceeding greatly a voltage level of the other portions of the lines; and registering the values of said time delay that corresponds to said value of the difference between the integrated values which is considerably greater than the other values of the difference between said voltages so as to integrate the faulty portion whose distance is correlated accurately to the registered value of said time delay.

2. A device for measuring the distance to a fault in a wire or cable line, comprising a clock pulse generator having two ouputs generating synchronizing pulses at a definite identical repetition rate; a control unit having an input connected to a first output of said clock pulse generator and producing pulses following at a repetition rate twice as low as that of the pulses from said clock pulse generator; a linearly-varying voltage generator having an input connected to a second output of said clock pulse generator and two outputs, the first output thereof producing pulses following in step at the same repetition rate of the pulses arriving to its input and the second output thereof producing a linearly-varying voltage; a potentiometer adapted to set different voltage levels varying within the same range of the values as the linearly-varying voltage and corresponding precisely to the distance to a fault in a portion of the line being monitored; a comparator having two inputs connected respectively to the second output of said linearly-varying voltage generator and to said pontentionmeter, and an output producing a pulse when the linearly-varying voltage reaches the level set by said potentiometer, said pulse at the output of said comparator having a time delay relative to the moment of time coinciding with the appearance of a pulse at the first output of said linearly-varying voltage generator; said linearly-varying voltage generator and comparator with said potentiometer defining a unit effecting said time delay of a measuring pulse relative to a sounding pulse; a measuring pulse generator having its input connected to the output of said comparator and producing at its output said measuring pulse at the instant said comparator operates; a commutator having a main input and a control input, said main input being connected to the first output of said linearly-varying voltage generator and said control input being connected to the output of said control unit, and an output producing pulses as every second pulse is applied to its main input; a sounding pulse generator having its input connected to the output of said commutator and sending said sounding pulses through said line as its input is supplied from the output of said commutator with pulses having a repetition rate twice as low as that of the pulses from said clock pulse generator; said commutator and sounding pulse generator forming a sounding pulse unit; a pulse modulator having two inputs and an output, the first input thereof being connected to said line and the second input being connected to the output of said measuring pulse generator, the pulse modulator output producing voltage signals proportional to the voltage signals arriving at said line at an instant coinciding with the arrival of said measuring pulse at its second input, said voltage signals being pulses reflected from the portion of said lines being monitored during the periods of the presence of output pulses, together with noise, and being only noise during the periods of the absence of output pulses; an amplifier having its input connected to the output of said modulator and amplifying the signals arriving from said pulse modulator; a first switch having a main and a control input and two outputs, the main input being connected to said amplifier, said switch alternately sending to its outputs pulses arriving to said main input in accordance with the control voltage across its control input which is connected to the output of said control unit so that the signal appearing at the first said output of said first switch is made up of pulses reflected from the portion of the line being monitored and of noise, and the signal appearing at the second output of said first switch is made up of noise only; two integrators each of said two integrators having an input and two outputs, the input of the first of said two integrators being connected to the first output of said first switch, the input of the second of said two integrators being connected to the second output of said switch so that the first of said two integrators integrates pulses reflected from the portion of the line being monitored, together with noise, the second of said two integrators integrating noise only; an indicating unit connected to the first outputs of both said integrators and adapted to measure the differential voltage across said outputs which corresponds to the useful signal free of noise, said indicating unit serving for visual observation or registration; and a second switch having a control input connected to said control unit, two additional inputs thereof being connected to the second outputs of said integrators and an output thereof being connected to the second input of said pulse modulator, said second switch alternately switching over the outputs of said integrators to its output, in accordance with the control voltage at its control input, to form a feedback between said integrators and said pulse modulator.

* * * * *